(No Model.)
J. S. JOHNSON.
COUPLING FOR TUBULAR FRAMES.
No. 493,166. Patented Mar. 7, 1893.
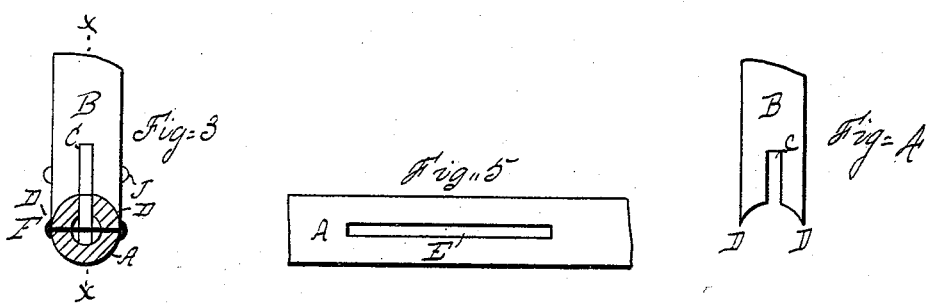
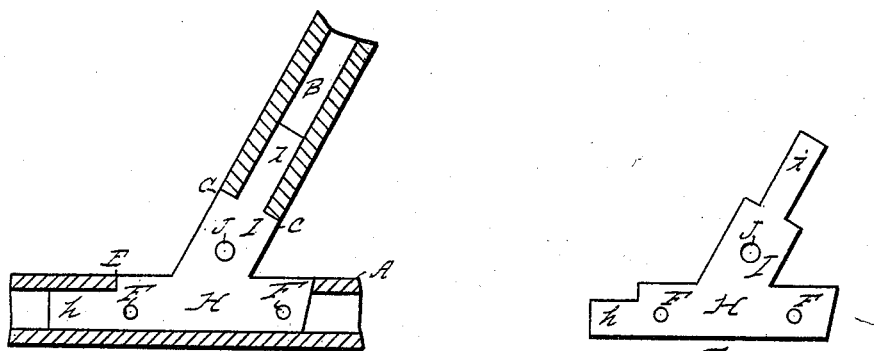
Witnesses
Gertrude H. Anderson
Geo. H. Lothrop
Inventor
James S. Johnson

UNITED STATES PATENT OFFICE.

JAMES S. JOHNSON, OF ALMONT, MICHIGAN.

COUPLING FOR TUBULAR FRAMES.

SPECIFICATION forming part of Letters Patent No. 493,166, dated March 7, 1893.

Application filed October 18, 1892. Serial No. 449,280. (No model.)

*To all whom it may concern:*

Be it known that I, JAMES S. JOHNSON, of Almont, in the county of Lapeer and State of Michigan, have invented a new and useful Improvement in Pipe-Couplings, of which the following is a specification.

My invention consists in an improvement in pipe couplings, hereinafter fully described and claimed.

Figure 1 is an elevation of a coupling piece. Fig. 2 is a central section through the two pieces of pipe coupled together. Fig. 3 is an end view. Fig. 4 is an elevation of a portion of one of the pieces of pipe, and Fig. 5 is a plan view of the other piece of pipe.

This invention is particularly designed for coupling together two pieces of pipe so that one of them will present a smooth and unbroken surface opposite the point of coupling, which is desirable for use in making sleighs or similar articles from pipe.

A and B represent portions of two pieces of pipe to be coupled together. The pipe A has a slot E cut through one wall, which slot is shorter than the coupling piece to be used. The pipe B has its lower end preferably hollowed out to fit the pipe A, as shown at D D Fig. 4, and has a slot C cut through both walls.

The coupling is a piece of sheet metal, of proper size and thickness for the place where it is to be used, and is represented in Fig. 1. The part H of said coupling is designed to fit the slot E in pipe A, and is provided with an extension $h$ of less width, the width of the extension $h$ being such as to fit the bore of the pipe A, as shown in Fig. 2. The part I fits in the slot C of pipe B, and has an upward extension $i$ of sufficient width to fit the bore of pipe B as shown in Fig. 2.

In the drawings I have indicated the two parts of the coupling H, I, as being at an acute angle with each other, because the drawings were made from a device in which pipes A, B, were coupled at such angle, but it is obvious that this will be changed to correspond with the angle at which it is desired to couple two pieces together.

J represents a rivet passing through pipe B and the part I of the coupling, and F F represent rivets passing through pipe A and the coupling, and these rivets may be used or not as necessity requires.

It will be seen that this peculiar coupling leaves the side of pipe A, which is opposite said coupling, smooth and unbroken, thus fitting it peculiarly for use as a sleigh runner.

What I claim as my invention, and desire to secure by Letters Patent, is—

1. A pipe coupling consisting of a pipe slotted through one wall, another pipe slotted at its end, and a sheet metal coupling adapted to fit in the slots of the two pipes, substantially as shown and described.

2. The combination of a pipe A having a slot E therein, the pipe B having the slot C therein, and the sheet metal coupling H, I, having the extensions $h$ $i$, substantially as shown and described.

3. A pipe coupling A having therein a slot C, pipe B having therein a slot C, and having its ends formed to fit the upper portion of pipe A, and a sheet metal coupling H I provided with the extensions $h$ $i$ and with the rivets J F, substantially as shown and described.

JAMES S. JOHNSON.

Witnesses:
GERTRUDE H. ANDERSON,
GEO. H. LOTHROP.